United States Patent
Kesselman et al.

(10) Patent No.: US 6,678,884 B1
(45) Date of Patent: Jan. 13, 2004

(54) METHOD FOR DETERMINING THE STATUS OF VARIABLES DURING THE EXECUTION OF OPTIMIZED CODE

(75) Inventors: Alexander Kesselman, Ramat Gan (IL); George Agasandian, Givataim (IL); Yoram Shacham, Zichron-Yaacov (IL); Arnon Mordoh, Kadima (IL)

(73) Assignee: Motorola, Inc., Schaumburg, IL (US)

( * ) Notice: Subject to any disclaimer, the term of this patent is extended or adjusted under 35 U.S.C. 154(b) by 532 days.

(21) Appl. No.: 09/608,385

(22) Filed: Jun. 30, 2000

(51) Int. Cl.$^7$ ................................................. G06F 9/44
(52) U.S. Cl. ........................................ 717/129; 717/132
(58) Field of Search .......................... 717/132, 124–131, 717/114–119, 140–161

(56) References Cited

U.S. PATENT DOCUMENTS 6,041,406 A   3/2000   Mann ......................... 712/227

OTHER PUBLICATIONS

Adl–Tabatabai et al., "Source–Level Debugging of Scalar Optimized Code," ACM Sigplan Notices, Association for Computing Machinery, New York, vol. 31, No. 5, May 1, 1996, pp. 33–43.

Wismuller, "Debugging of Globally Optimized Programs Using Data Flow Analysis," ACM Sigplan Notices, Association for Computing Machinery, New York, vol. 29, No. 6, Jun. 1, 1994, pp. 278–289.

Dhamdhere et al., "Dynamic Currency Determination in Optimized Programs," ACM Transactions on Programming Languages and Systems (TOPLAS), vol. 20, No. 6, Nov. 1998, pp. 1111–1130.

*Primary Examiner*—Kakali Chaki
*Assistant Examiner*—L J Shrader

(57) ABSTRACT

A method for determining a status of a variable during an execution of an optimized code, the optimized code being originated from a source code, the method comprising the steps of: (A) Receiving at least a source flow graph, an optimized flow graph and information that describes a connection between instructions within the optimized code and statements in the source code; receiving a request to show the status of the variable at a breakpoint. (B) Generating a source reaching definition set and a reflected optimized reaching definition set. (C) Comparing the source reaching definition set and the reflected optimized reaching definition set and determining a status of a variable.

25 Claims, 1 Drawing Sheet

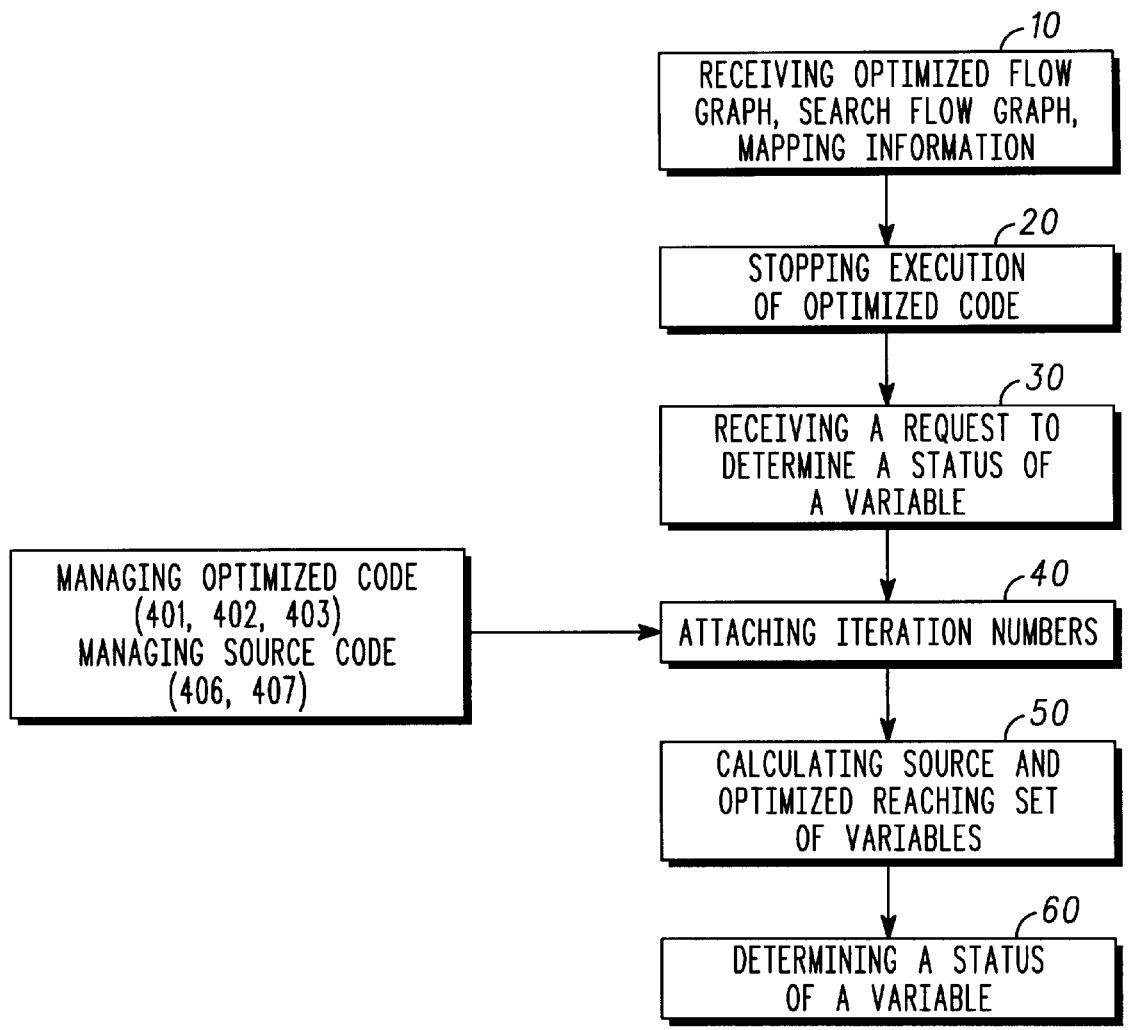

METHOD FOR DETERMINING THE STATUS OF VARIABLES DURING THE EXECUTION OF OPTIMIZED CODE

FIELD OF THE INVENTION

A method for optimized code debugging and especially a method for determining the status of variables during an execution of optimized code.

BACKGROUND OF THE INVENTION

A debugger is a software tool that enables a user to analyze and probe another computer program, the other computer program is referred to as the debugged computer program. A common method to analyze and probe the debugged computer program involves the execution of portions or steps of the debugged computer program. Usually, a user can execute a single instruction or statement and check various variables or other indications that can help the user to debug the debugged computer program.

There is a growing need to enhance the efficiency of software execution. One method for achieving said goal is to receive a source code and to compile it in a manner that provides an optimized object code. A compiler compiles the source code in a manner that best fits the hardware that is supposed to execute the object code. Such an optimization is vital when the software is to executed by parallel processors, but is also of great significant in other cases.

A premium is placed upon optimizing computer programs that are written in high level languages such as C++, C, Java. Writing computer program in these languages is easier than writing computer programs in low level languages such a assembler. Furthermore, a single software program written in high level language can be easily compiled to a plurality of low level language computer programs, to fit a plurality of processors. The efficiency of non-optimized object code that is generated by a non-optimizing compiler from a computer program that is written in a high level language is considerably worse than that of the corresponding assembly language code. Therefor, there is a need to optimize the object code.

The optimization process can largely complicate the relationship between the source code and the object code, so that the debugging of optimized code is very complex. The complexity can be attributed to various factors. A major factor is that during the optimization process statements are executed out of order and instructions are interleaved, i.e., a code can be moved out of sequence so that part of a statement, or a complete statement, is moved in relation to other statements causing that variables are assigned their values out of order.

A debugger must be able to retrieve and display the values of source variables in a manner consistent with what a user may expect with respect to the source statement where execution has halted. When a program has been compiled with optimizations, mappings between breakpoints in the source and object code become complicated, and values of variables may either be inaccessible in the run-time state or inconsistent with what the user expects.

Thus, the debugger not only has to determine a variable's storage location or associated register. The debugger must also verify the status of the value, i.e., the correspondence of the actual value of the variable to the value that the variable would have in non-optimized code. A variable is current if both values are equal.

A thorough review of prior art optimized code debuggers can be found at the following article: R. F. Brender, J. E. Nelson and M. E. Arsenault "Debugging Optimized Code: Concepts and Implementation on DIGITAL Alpha Systems," Digital Technical Journal, Dec. 10 1998". As seen from this article prior art methods of determining the status of variables during the execution of optimized code were vary limited.

There is a need to provide a method for allowing an efficient determination of the status of variables during the execution of optimized code.

BRIEF DESCRIPTION OF THE INVENTION

While the invention is pointed out with particularity in the appended claims, other features of the invention are disclosed by the following detailed description taken in conjunction with FIG. 1 that is is a schematic flow chart of a method for determining the status of variables during the execution of optimized code, according to a preferred embodiment of the invention.

DETAILED DESCRIPTION OF THE INVENTION

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a method for optimized code debugging and especially a method for determining the status of variables during an execution of optimized code that supports various of optimizations performed by modem compilers without imposing restrictions on the optimized flow graph form. Said method uses run-time information in order to achieve better variables currency deciding rate.

The invention provides a method for optimized code debugging and especially a method for determining the status of variables during an execution of optimized code that is based upon the reception of a final mapping between a source code and an optimized code, thus eliminating the need to record the 'history' of the optimization process of the source code.

For convenience of explanation, but without limiting the scope of the invention, the following terms shall be given the following meaning:

"source statement" is statement written in a programming language. An executable statement species some action.

"source block" is a sequence of source statements which are always executed continuously. None of the source statements, except the last source statement in the block, can initiate a change of flow. None of them, except the first one can be a target of a change of flow. In a graph representation of the source program a source block appears as a node. The graph representation is referred to as a source flow graph)

"basic block" is a sequence of optimized instructions/ machine instructions which are always executed continuously. None of the optimized instructions, except the last optimized instruction in the block, can initiate a change of flow. None of them, except the first one can be a target of a change of flow. In a graph representation of the optimized program a basic block appears as a node. The graph representation is referred to as a optimized flow graph.

"current basic block" is a basic block containing a current machine instruction. A current machine instruction is an instruction that is pointed by a current Program Counter.

"flow graph of a program" is a directed graph (B,E), where B is the set of blocks, E is the set of directed edges such that (bi, bj) belongs to E if and only if the flow control may immediately reach bj from bi.

"source flow path" is a sequence of source blocks (b1:s1, b2, . . . , bn:sn) where bi+1 is an immediate successor of bi in the source flow graph. The flow path does not necessarily start or finish at a first block or a last block accordingly.

"optimized flow path" is a sequence of basic blocks (b1:adr1, b2, . . . , bn:adm) where bi+1 is an immediate successor of bi in the optimized flow graph. The flow path does not necessarily start or finish at a first block or a last block accordingly.

"DFS tree"—a depth first search tree is the acyclic graph resulting from the removal of back edges of a cyclic graph.

"rooted DFS tree"—a rooted DFS tree of a basic block that was generated by a DFS search that started from the basic block.

A definition of a variable V is a statement in source program in which a value is assigned to variable V. The definition D of a variable V reaches breakpoint B along the path P ending at breakpoint B if and only if D is the last statement of P that is a definition of V.

A reaching definitions set of the variable V at a breakpoint B is a set of all V's definitions that may reach B along some simple (without repeated nodes) path terminating at B.

A source reaching definition set is the reaching definitions set within the source flow graph.

An optimized reaching definition set is the reaching definitions set within the optimized flow graph. A reflected optimized reaching definition set comprises of source statements from which the optimized definition set were generated.

"expected value of a variable"—an expected value of a variable V at a breakpoint B is the value that would be predicted by examining the source code and knowing the relevant context.

"actual value"—an actual value of a variable V at breakpoint B is the value in V's storage location. The actual value of a variable can be either current, non current, suspected or non-resident.

(a) An actual value is current if it is equal to the expected value. In such a case the reflected optimized reaching definitions set of V at B is a subset of the source reaching definitions set of V at B.

(Two) An actual value is non-current if it is not equal to the expected value. In such a case the intersection of the source reaching definitions set of V at B and the reflected optimized reaching definitions set of V at B is empty.

(Three)An actual value is suspected if it may be either current or non-current. In such a case the intersection of the source reaching definitions set of V at B and the reflected optimized reaching definitions set of V at B is non-empty.

(Four) An actual value is non-resident if V is optimized out at the breakpoint.

In such a case V's location list contains no location whose PC's range includes the PC that points to the breakpoint. The location list is the list of all the variable locations that cover the lexical scope of the variable visibility.

A variable has split lifetimes if the variable resides in different locations during the execution of the program. For example, sometimes the variable is stored in a register, sometimes it is stored in another memory module, and sometimes it is not stored anywhere. Variables having split lifetime are supported by the method for determining the statuses of variables during the execution of optimized code by the usage of variables location. Variable locations indicate the location of a variable throughout the optimized code. Said location can be a certain memory location, a certain register. A location is marked as undefined when a variable is optimized out—the variable does not appear in the optimized code. When a variable has more then a single location it is associated to more than one variable locations. A variable location is valid for a portion the optimized code, the portion starts when the variable becomes valid and ends when the variable becomes invalid.

A current basic block is a basic block that contains the current instruction pointed by the program counter PC (at the execution stopping point). The current instruction can be mapped to a number of source statements. One of these statements is selected as "current statement". The node in the source flow graph containing the current statement is the current source block.

"indirect definition"—is a statement in a source program where a value is assigned to a variable that is pointed by a pointer. An indirect definition D of the variable V reaches the breakpoint B along the path P ending at B if and only if D appears after the last statement of P that is a direct definition of V (if any). Usually, the pointer can point to at least two variables, so that when the source code is processed the value of the variable is still not unknown. Indirect definitions may allow other definitions to reach the breakpoint. Because of this uncertainty, The reaching set of a variable at a breakpoint is the union of its direct and indirect reaching sets.

The meaning of some of said terms is better illustrated by the following exemplary source code and the following explanations:

| [1] | func(int tabin) { |
| [2] | int i = o, *p=&tabin; |
| [3] | *p=codeconv (nb__measure); |
| [4] | if (!nb__measure) |
| [5] | tabin = 0Xda; |
| [6] | else |
| [7] | tabin = codeconv(nb__measure); |
| [8] | while (i < PT__CELL) { |
| [9] | tabin = code__tch__3 (tabin); |
| [10] | i++; |
| [11] | } |
| [12] | return tabin; |
| [13] | } |

Whereas the variable PT__CELL was set to 2 prior to said source code.

The source code comprises of 13 lines/statements, which are referred to a L1–L13. An optimized code generated from said source code comprises of six basic blocks BB1–BB6, and eight instructions ln4, ln5, ln2, ln7, ln3, ln9, ln9 and ln12, generated from L4, L5, L2, L7, L3, L9, L9 and L12 of the source code accordingly. Instruction 19 appears twice because the loop L8–L11 that is repeated twice (PT__CELL= 2) is unrolled in the optimized code—ln9 appears twice.

In the source code L2 and L3 are followed by L4, L4 is followed by either L5 or L7; L5 and L7 are followed by L8, L8 is followed by L9 and L10 or by L12, L9 and L10 are followed by L8.

An optimized code generated from said source code starts with ln4 and ln5; ln4 and ln5 are followed by either ln3 or ln2 and ln7; ln2 and ln7 are followed by is followed by ln9; ln9 is followed by another ln9, and the other ln9 is followed by ln12. A first breakpoint BP1 is set at ln3, a second and third breakpoints BP2 and BP3 are set at ln9 and the other ln9 accordingly.

If the current statement is ln3/L3 then in relation to BP1 and to a path that includes lines ln4,ln5,ln2 and ln7/ L4, L5, L2, L7 the variable tabin is non-current since its source reaching definitions set is empty and, the optimized reaching definitions set is L5 and the reflected optimized reaching definition set is ln5.

If the current statement is ln9/ L9 then in relation to BP2 and to a path that includes ln4, ln5 and ln3/L4, L5 and L3 the variable tabin is current since its source reaching definitions set is L5 and L7, the corresponding optimized reaching definitions set is l5 and the reflected optimized reaching definition set is L5.

The variable i is non-resident at all breakpoints due to loop L8–L11 unrolling.

In absence of indirect definitions there are no suspected variables since the optimized reaching definitions set consists of a single definition.

If the current statement is ln9/L9 then in relation to BP2 and to a path that includes ln4, ln5, ln2, ln7 and ln3/L4, L5, L2, L7 and L3 the variable tabin suspected since its source reaching definitions set is L5 and L7, the corresponding optimized reaching definitions set is l5 and l3 and the reflected optimized reaching definition set is L3 and L5. Instruction l7 involves an indirect definition.

Referring to FIG. 1, method 9 starts with step 10 of receiving the following debug information:

(One) The source flow graph.

(Two) The optimized flow graph.

(Three) A mapping between the statements in the source code and the instructions in the optimized code. Given a source statement one can obtain the set of instructions generated by the statement.

(Four) A mapping between the instructions in the optimized code and the source statements. Given a machine instruction address one can obtain the set of source statements that generate the instruction.

(Five) A relative iteration tag, attached to each instruction that is within a loop.

(Six) At least one variable location field for each variable.

(Seven) A flag that marks the definition statements of each variable.

Usually, step 10 is followed by step 20 of stopping the execution of an optimized code.

Step 20 is followed by step 30 of receiving a request to display a status of a variable.

Step 30 is followed by step 40 of attaching iteration numbers to definitions within the source flow graph and the optimized flow graph. Step 24 deals with loops within flow graphs.

Conveniently, step 40 involves a preprocessing step 401. The preprocessing step starts by splitting 402 the current node into two parts, a first part, also referred to as that begins at the start of the node and up to the current statement and a second part that starts from the current statement and ends at the end of the current node. If some sub-node is empty a dummy node is created. Said splitting emphasize the difference between the part of the node that definitely has already been executed before hitting the breakpoint and the other part that may or may not have been executed. The splitting step is followed by a step 403 of throwing out parts of the graph that are unreachable from the current node.

The preprocessing step is followed by attaching iteration numbers to definitions 404 within a current executed loop. Said iteration number allows to differentiate between definitions that were performed during an iteration and those who are to be executed. A first iteration number is associated to a definition within the source code while a second is associated to a definition within the optimized code. Conveniently, statements that are not a part of the loop are not associated to iteration numbers or are associated to an iteration number that is not valid/unidentified.

When an optimized code is executed by a processor that has a trace buffer the iteration number of a statement that is a part of a current executed loop can be determined by using a trace buffer. Preferably, it is sufficient to track only the execution of the last two iterations of the loop.

Usually, assigning iteration numbers to statements of the source code is more problematic from the assignment of iteration numbers to instructions of the optimized code. The determination starts by dividing 406 every currently executing loop into a first part that was executed during a current iteration and a remaining part which was not executed during the current iteration. The division is followed by giving 407 statements of the first part an iteration number that is higher (by one) then the iteration number associated to the statements of the second part. Such a determination is relatively simple when the actual iteration number can be determined—when said statement is mapped to the optimized flow path.

A reference statement of a loop is a first statement of the loop that fulfills the following conditions (a) it is not a part of another inner/nested loop; (b) it appears on a source flow path leading to the current statement when it is passed in backward direction that also appears on the optimized flow path. An iteration number of a loop equals an iteration number of an instruction that represents the reference statement. Accordingly, the iteration number of a loop is associated to all definitions that precede the reference statement of said loop and is associated to the reference statement. A previous iteration number is associated to the statements that succeed the reference statement. A previous iteration number of a first iteration equals zero. Conveniently, iteration numbers are assigned only to currently executed loops, while statements that are not a part of currently executed loops are associated to non valid/unidentified.

Assuming that the current statement is L9 then in relation to BP3 and to a path that includes ln4, ln5 ln3, and ln9/L4, L5, L3 and L9, the reference statement loop is L9 and its actual iteration number is 1. Accordingly, L9 is associated to iteration number "1" and L10 is associated to iteration number "0". All other statements are associated to in valid/unidentified iteration number. Variable tabin is current since its source reaching definitions set is L9 and the associated iteration number is 1, the corresponding optimized reaching definitions set is ln9 and the associated iteration number is 1 and the reflected optimized reaching definition set is L9 and the corresponding iteration number is 1.

Step 40 is followed by step 50 of calculating a source and optimized reaching set of a variable. The reaching set of the node of the optimized flow graph that has at least one direct definition of the variable comprises of a last direct definition of the node and indirect definitions that follow the last direct definition. If a direct definition is reached there is no need in checking the node's predecessors (successors in a reversed DFS tree). If a node does not have a direct definition then its optimized reaching set comprises of a union of the reaching sets of its predecessors (successors in a reversed FS tree) and all its indirect definitions.

An optimized reaching definitions set may be obtained by checking the 'history' of the execution of the optimized code. The instructions that were previously executed are scanned until a first definition is reached. During said scan indirect definitions are stored.

The calculation of source reaching set of a variable involves checking all possible source flow paths that end at the breakpoint. The source reaching set comprises from all the definitions of the variable that may reach the breakpoint along one of these paths.

The following exemplary code illustrates step 50. The code starts at the current node (at the first part of the current node). The code visits each node and computes its reaching definition set. This information is propagated in a bottom-up fashion.

```
[1]   compute_reaching_definitions_set(Node v, Variable var)
[2]   {
[3]     /* set the color of the node to be GRAY */
[4]     v->color = GRAY;
[5]     /* get the last direct definition and the following indirect ones */
[6]     v->set = get_definitions(v, var);
[7]     /* check whether the node contains a definition of the "var" */
[8]     if (v->set contains a direct definition)
[9]       return;
[10]    /* iterate through the adjacency list */
[11]    for each (w in Adj(v)) {
[12]      /* check whether the node is unvisited */
[13]      if(w->color == WHITE) {
[14]        /* compute the set of the successor */
[15]        compute_reaching_definitions_set(w, var);
[16]        /* compute the union of the successors sets */
[17]        v->set = union(v->set, w->set);
[18]      }
[19]    }
[20]    /* set the color of the node to be BLACK */
[21]    v->color = BLACK;
[22]  }
```

Step 50 is followed by step 60 of determining the status of a variable. Step 60 involves comparing the reflected optimized reaching definitions set of a variable at a breakpoint and the source reaching definitions set of said variable t said breakpoint. Usually, after the status of a variable is determined, and even displayed, the execution of the optimized code is resumed.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an improved method and apparatus for implementing a method for determining the status of variables during the execution of optimized code. It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

What is claimed is:

1. A method for determining a status of a variable during an execution of an optimized code, the optimized code being originated from a source code, the method comprising the steps of:
   (1) receiving at least a source flow graph, an optimized flow graph and information that describes a connection between instructions within the optimized code and statements in the source code; receiving a request to show the status of the variable at a breakpoint;
   (2) generating a source reaching definition set and a reflected optimized reaching definition set, wherein the source reaching definition set is a set of all variable definitions for a given variable that may be reached along a given path within the source flow graph, and wherein the reflected optimized reaching definition set is a set of source statements for all variable definitions for a given variable that may be reached along a given path within the optimized flow graph; and
   (3) comparing the source reaching definition set and the reflected optimized reaching definition set and determining a status of a variable.

2. The method of claim 1 wherein a variable status can be either 'current' or 'not current'; wherein a variable status is current when the reflected optimized reaching definition set is a subset of the source reaching definition set; and
   wherein a variable status is not current when an intersection of the reflected optimized reaching definition set and the source reaching definition set is empty.

3. The method of claim 2 wherein a variable status can further be 'suspected', wherein a variable status is suspected when the status is not 'current' and an intersection of the reflected optimized reaching definition set and the source reaching definition set is not empty.

4. The method of claim 3 wherein a variable status is 'suspected' if the an indirect definition of the variable is included in an optimized reaching definition set.

5. The method of claim 2 wherein a variable status can further be 'non resident', wherein a variable status is non resident when the variable is optimized out.

6. The method of claim 1 wherein step 1(2) further involves assigning iteration numbers to definitions within the source code and the optimized code, wherein the determination of a variable status is further based upon said iteration numbers.

7. The method of claim 6 wherein a variable status can be either 'current' or 'not current'; wherein a variable status is current when the reflected optimized reaching definition set is a subset of the source reaching definition set and when the iteration numbers associated to an optimized reaching definition set match the iteration numbers associated to said subset of the source reaching definition set; and
   wherein a variable status is not current when (a) an intersection of the reflected optimized reaching definition set and the source reaching definition set is empty; or (b) the reflected optimized reaching definition set is a subset of the source reaching definition set and the iteration numbers associated to an optimized reaching definition set do not match the iteration numbers associated to said subset of the source reaching definition set.

8. The method of claim 6 wherein a variable status can further be 'suspected', wherein a variable status is suspected when an intersection of (a) the reflected optimized reaching definition set and associated iteration numbers and (b) the source reaching definition set and associated iteration numbers, is not empty.

9. The method of claim 8 wherein a variable status is 'suspected' if the status is not 'current' and an indirect definition of the variable is included in an optimized reaching definition set.

10. The method of claim 6 wherein a variable status can further be 'non resident', wherein a variable status is non resident when the variable is optimized out.

11. The method of claim 6 wherein step 1(2) involves checking all possible flow paths that end at a predetermined breakpoint and accumulating definitions of the variable that can reach the predetermined breakpoint.

12. The method of claim 6 wherein the assignment of iteration numbers is preceded by splitting a current node into two parts at the current statement, and ignoring nodes of the optimized flow graph and the source flow graph that are unreachable from the current node.

13. A method for determining a status of a variable during an execution of an optimized code, the optimized code being originated from a source code, the method comprising the steps of:
   (1) receiving at least a source flow graph, an optimized flow graph and information that describes a connection between instructions within the optimized code and statements in the source code;
   (2) receiving a request to show the status of the variable at a breakpoint;
   (3) stopping the execution of the optimized code;
   (4) generating a source reaching definition set and a reflected optimized reaching definition set, wherein the source reaching definition set is a set of all variable definitions for a given variable that may be reached alone a given path within the source flow graph, and wherein the reflected optimized reaching definition set is a set of source statements for all variable definitions for a given variable that may be reached along a given path within the optimized flow graph; and
   (5) comparing the source reaching definition set and the reflected optimized reaching definition set and determining a status of a variable.

14. The method of claim 13 wherein step 13(5) is followed by a step of resuming an execution of the optimized code.

15. The method of claim 13 wherein a variable status can be either 'current' or 'not current'; wherein a variable status is current when the reflected optimized reaching definition set is a subset of the source reaching definition set; and
   wherein a variable status is not current when an intersection of the reflected optimized reaching definition set and the source reaching definition set is empty.

16. The method of claim 15 wherein a variable status can further be 'suspected', wherein a variable status is suspected when an intersection of the reflected optimized reaching definition set and the source reaching definition set is not empty.

17. The method of claim 16 wherein a variable status is 'suspected' if the an indirect definition of the variable is included in an optimized reaching definition set.

18. The method of claim 15 wherein a variable status can further be 'non resident', wherein a variable status is non resident when a definition of the variable does not appear in the optimized code.

19. The method of claim 13 wherein step 13(4) further involves assigning iteration numbers to definitions within the source code and the optimized code, wherein the determination of a variable status is further based upon said iteration numbers.

20. The method of claim 19 wherein a variable status can be either 'current' or 'not current'; wherein a variable status is current when the reflected optimized reaching definition set is a subset of the source reaching definition set and when the iteration numbers associated to an optimized reaching definition set match the iteration numbers associated to said subset of the source reaching definition set; and
   wherein a variable status is not current when (a) an intersection of the reflected optimized reaching definition set and the source reaching definition set is empty; or (b) the reflected optimized reaching definition set is a subset of the source reaching definition set and the iteration numbers associated to an optimized reaching definition set do not match the iteration numbers associated to said subset of the source reaching definition set.

21. The method of claim 19 wherein a variable status can further be 'suspected', wherein a variable status is suspected when an intersection of (a) the reflected optimized reaching definition set and associated iteration numbers and (b) the source reaching definition set and associated iteration numbers, is not empty.

22. The method of claim 21 wherein a variable status is 'suspected' if the stsrus is not 'current' and an indirect definition of the variable is included in an optimized reaching definition set.

23. The method of claim 19 wherein a variable status can further be 'non resident', wherein the status is non resident when the variable is optimized out.

24. The method of claim 19 wherein step 13(4) involves checking all possible flow paths that end at a predetermined breakpoint and accumulating definitions of the variable that can be reach the predetermined breakpoint.

25. The method of claim 17 wherein the assignment of iteration numbers is preceded by splitting a current node into two parts at the current statement, and ignoring nodes of the optimized flow graph and the source flow graph that are unreachable from the current node.

* * * * *